United States Patent [19]

Wilhelm et al.

[11] Patent Number: 4,637,588
[45] Date of Patent: Jan. 20, 1987

[54] NON-BOLTED RINGLESS NOZZLE DAM

[75] Inventors: John J. Wilhelm, New Kensington; Gregory L. Calhoun, Allegheny Township, Blair County; Paul H. Dawson, Plum Borough; Arthur W. Kramer, Franklin Township, Armstrong County, all of Pa.

[73] Assignee: Westinghouse Electric Corp., Pittsburgh, Pa.

[21] Appl. No.: 605,354

[22] Filed: Apr. 30, 1984

[51] Int. Cl.⁴ .................. F16K 31/44; F16L 55/12
[52] U.S. Cl. .................................... 251/280; 138/93; 277/34
[58] Field of Search ............... 138/89, 93; 220/234, 220/235, 236, 237; 251/280; 166/187, 195; 376/204, 203; 277/27, 30, 34, 34.3, 34.6, 246

[56] References Cited

U.S. PATENT DOCUMENTS

| | | | |
|---|---|---|---|
| 1,202,704 | 10/1916 | Goff | 220/235 |
| 1,808,411 | 6/1931 | Hinkston | 220/236 |
| 2,238,710 | 4/1941 | Shapiro . | |
| 2,942,666 | 6/1960 | True et al. | 277/34.6 |
| 3,052,302 | 9/1962 | Lagucki | 166/187 |
| 3,204,697 | 9/1965 | Gaut | 166/187 |
| 3,537,483 | 11/1970 | Teague, Jr. | 138/93 |
| 3,593,749 | 7/1971 | Reardon | 138/93 |
| 3,618,811 | 11/1971 | Martino | 220/235 |
| 3,707,758 | 1/1973 | Townsend | 376/203 |
| 3,722,895 | 3/1973 | Mevissen | 277/34.3 |
| 3,884,261 | 5/1975 | Clynch | 138/93 |
| 4,109,922 | 8/1978 | Martin | 277/34.3 |
| 4,140,240 | 2/1979 | Platts | 138/89 |
| 4,185,806 | 1/1980 | Dremann | 138/93 |
| 4,248,271 | 2/1981 | Burgess | 138/89 |
| 4,262,702 | 4/1981 | Streich | 138/89 |
| 4,285,368 | 8/1981 | Terrill et al. | 138/89 |
| 4,291,727 | 9/1981 | Yie et al. | 138/93 |
| 4,349,204 | 9/1982 | Malone | 166/187 |
| 4,422,477 | 12/1983 | Wittman et al. | 138/89 |
| 4,442,867 | 4/1984 | de Sivry et al. | 138/93 |
| 4,470,946 | 9/1984 | Vassalotti et al. | 376/204 |
| 4,482,076 | 11/1984 | Wentzell | 138/93 |
| 4,483,457 | 11/1984 | Schukei et al. | 138/93 |
| 4,518,015 | 5/1985 | Fischer . | |

FOREIGN PATENT DOCUMENTS 814366 7/1951 Fed. Rep. of Germany .

OTHER PUBLICATIONS

"Steam Generator Nozzle Dams for Primary Head Activities", Lewis & Woods, American Society of Mechanical Engineers, Mar. 12, 1980.

Primary Examiner—Samuel Scott
Assistant Examiner—H. A. Odar
Attorney, Agent, or Firm—L. A. DePaul

[57] ABSTRACT

A nozzle dam for providing a fluid-tight seal across a primary fluid nozzle in the plenum of a nuclear steam generating vessel includes an elongated shaft coupled at one end thereof to an anchor assembly frictionally engageable with the inner surface of the nozzle to anchor the dam in place and a fluid-impermeable seal apparatus coupled to the shaft and closing the nozzle and frictionally engageable with the inner surface thereof to form a fluid-tight seal. The seal apparatus includes a circular plate disposable in wedging frictional engagement with a frustoconical portion of the nozzle inner surface. The shaft extends through a central aperture in the plate and is threadedly engaged with a nut which holds the plate in place. The anchor assembly includes a foldable tripod arrangement coupled to the shaft in such a way that movement of the shaft toward the seal plate effects an increase in the frictional anchoring force. The seal assembly also includes an inflatable portion. In one embodiment this inflatable portion extends around the perimeter of the seal plate and is readily expandable. In another embodiment the inflatable portion includes inflatable pillows disposed between the seal plate and the anchor assembly and inflatable for completely closing the nozzle. A foldable tripod centering mechanism and a shaft tensioning tool are also disclosed.

27 Claims, 14 Drawing Figures

NON-BOLTED RINGLESS NOZZLE DAM

BACKGROUND OF THE INVENTION

The present invention relates to devices for providing a fluid-tight seal or block in a tubular member such as a conduit or nozzle or the like. The invention has particular application to providing a dam or seal in the primary fluid nozzles of a nuclear steam generator.

A typical nuclear steam generator comprises a vertically oriented shell or vessel. A tube sheet toward the lower end of the vessel supports a tube bundle comprising a plurality of tubes, each generally in the shape of an inverted U. The portion of the vessel beneath the tube sheet is divided by a partition into inlet and outlet plenums which are respectively disposed immediately beneath the vertical legs of the tube bundle. The vessel is provided with primary fluid inlet and outlet nozzles respectively communicating with the plenums, each nozzle projecting outwardly of the vessel and commonly having a frustoconical portion and a circularly cylindrical portion. The nozzles are connected by conduits to an associated nuclear reactor vessel.

Primary fluid, having been heated by circulation through the reactor, enters the steam generator vessel through the primary inlet nozzle to the inlet plenum and from there flows upwardly through the tube bundle to the outlet plenum and then back through the outlet nozzle to the reactor core. The tube bundle above the tube sheet is immersed in a secondary fluid, such as water, the tube bundle serving as a heat exchanger for converting the secondary water to steam, which is then used for generating electricity in the usual manner.

Periodically, it is necessary to shut down the reactor for refueling. This is usually a convenient time for servicing the nuclear steam generator. In this regard, reactor is drained to below the level of the inlet and outlet nozzles of the steam generator vessel. The tube bundle and inlet and outlet plena are also drained and dams are then installed in the inlet and outlet nozzles to block them. Once these dams are in place, the reactor can then be refilled with water for the refueling operation, without interfering with service activities being conducted in the steam generator vessel. The water serves as both a shield and a moderator during the refueling operation, but the dams in the steam generator nozzles prevent flow of this material into the steam generator vessel. Also, the steam generating vessel can be treated in a chemical decontamination procedure without contaminating the primary fluid conduits and the nuclear reactor.

Heretofore, there have been generally two types of fixed or static nozzle dams utilized. One type involves drilling of holes in the inner surface of the nozzle to receive radially extendable pins from a sectional seal or dam plate which is inserted in the nozzle. The plate carries a seal diaphragm which may have radially inflatable portions around the periphery thereof to frictionally engage the inner surface of the nozzle.

Another type of dam involves the mounting of an attachment ring inside the nozzle at its distal end, as by welding, this ring serving as an attachment ring on which a nozzle dam plate can be attached, by suitable fasteners such as bolts. Both of these techniques involve modification of the nozzle, and if the modification is effected after the steam generator is in service, man-rem exposure is involved. Also, both of these types of dams can affect the flow of primary fluid through the nozzle, particularly in the case of the attachment ring which projects radially into the nozzle and could alter the flow path.

It is also known to utilize expandable bags or diaphragms or the like which are inserted in the nozzle and expanded to plug the nozzle. But such expandable seals can sustain only a very limited pressure differential on the opposite sides thereof, since they do not adhere particularly well to the nozzle inner surface and are not anchored thereto. Thus, they are useful in only very limited applications.

SUMMARY OF THE INVENTION

It is a general object of the present invention to provide an improved means for sealing the primary fluid nozzles of a nuclear steam generating vessel, which means avoids the disadvantages of prior sealing arrangements, while affording additional structural and operating advantages.

An important object of the present invention is the provision of a nozzle dam which does not require any modification of the nozzle.

In connection with the foregoing object, an object of the present invention is the provision of a nozzle dam which can be mounted inside the nozzle without the use of mounting bolts or pins.

In connection with the foregoing object, it is another object of this invention to provide a nozzle dam, the mounting mechanism for which does not impair the flow path of the primary fluid through the nozzle.

It is another object of this invention to provide a nozzle dam of the type set forth which provides dual sealing capabilities including primary and backup seals.

Still another object of this invention is the provision of a nozzle dam which can withstand increases in pressure from either of the dam.

In connection with the foregoing object, still another object of this invention is the provision of a nozzle dam of the type set forth, which is responsive to a pressure differential across the dam for increasing the force with which the dam is held in place in the nozzle.

Yet another object of the invention is the provision of a nozzle dam of the type set forth which is foldable to permit insertion into the steam generating vessel through relatively small access openings.

These and other objects of the invention are attained by providing a nozzle dam for preventing fluid flow through a primary fluid nozzle in the plenum of a nuclear steam generating vessel, wherein the nozzle has an inner surface, the nozzle dam comprising: fluid-impermeable seal means disposable in a sealing condition within the nozzle extending across and closing the nozzle and frictionally engageable with the inner surface thereof around the entire perimeter thereof to form a fluid-tight seal, and anchor means coupled to the seal means and mountable solely by frictional engagement with the inner surface of the nozzle securely to hold the seal means in its sealing condition.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

DESCRIPTION OF THE PREFERRED EMBODIMENTS

Figure 1:
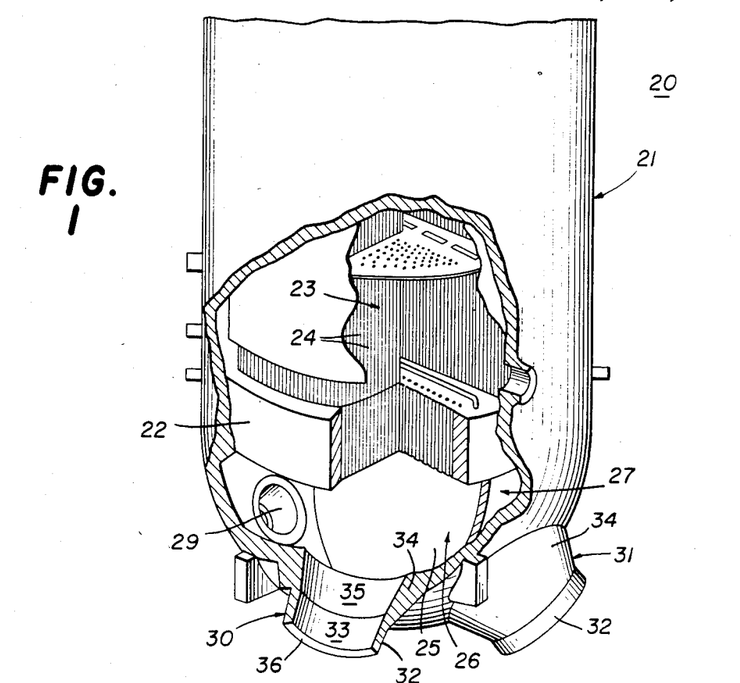
FIG. 1 is a fragmentary perspective view of the lower end of a nuclear steam generating vessel, with portions broken away more clearly to illustrate the inlet and outlet nozzles and manway with which the present invention is used.

Referring to FIG. 1, there is illustrated a portion of a nuclear steam generator plant, generally designated by the numeral 20, including a vessel 21, having a generally part-spherical lower end which is separated from the upper end of the vessel 21 by a horizontally disposed tube sheet 22. Mounted on the tube sheet 22 is a tube bundle 23, including a plurality of generally inverted U-shaped tubes 24 having the lower ends thereof disposed through complementary bores in the tube sheet 22. The portion of the vessel 21 below the tube sheet 22 is divided by a wall 25 into an inlet plenum 26 and an outlet plenum 27, which respectively communicate with the two vertical leg portions of the tubes 24. Formed in the vessel 21 are manways 29 (one shown providing access to the inlet and outlet plenums 26 and 27. Also respectively communicating with the inlet and outlet plenums 26 and 27 and projecting outwardly from the vessel 21 are two nozzles 30 and 31, each having an outer cylindrical portion 32 having a cylindrical inner surface 33 and inner frustoconical portion 34 having a frustoconical inner surface 35. The outer end of each of the nozzles 30 and 31 defines an annular end wall 36 which is adapted to be secured, as by suitable weldment 37 (see FIG. 2), to an associated conduit 38 which extends to an associated nuclear reactor vessel (not shown).

In general, at least two types of nozzles are provided in existing steam generator vessels. One type has a relatively long cylindrical portion 32 and a relatively short frustoconical portion 34, this type being exemplified by the nozzle 30. Another type has a relatively short cylindrical portion 32 and a relatively long frustoconical portion 34, this type being exemplified by the nozzle 31. Normally, both of the nozzles on the vessel 21 will be of the same type, but both types have been shown in FIG. 1 for purposes of illustration.

Figure 2:
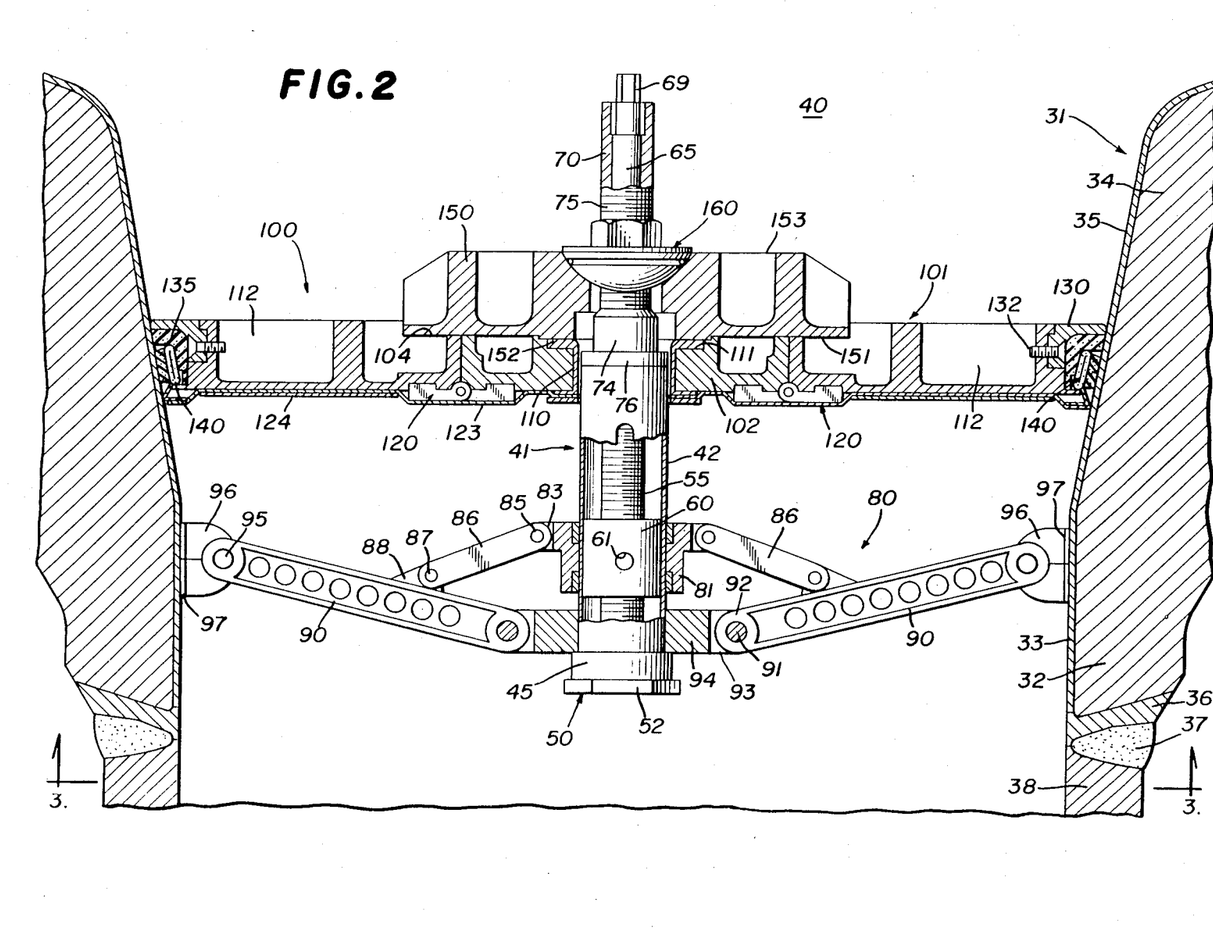
FIG. 2 is an enlarged sectional view illustrating a nozzle dam constructed in accordance with and embodying the features of a first embodiment of the present invention, illustrated mounted in position in one of the nozzles of the nuclear steam generating vessel of FIG. 1.
Figure 3:
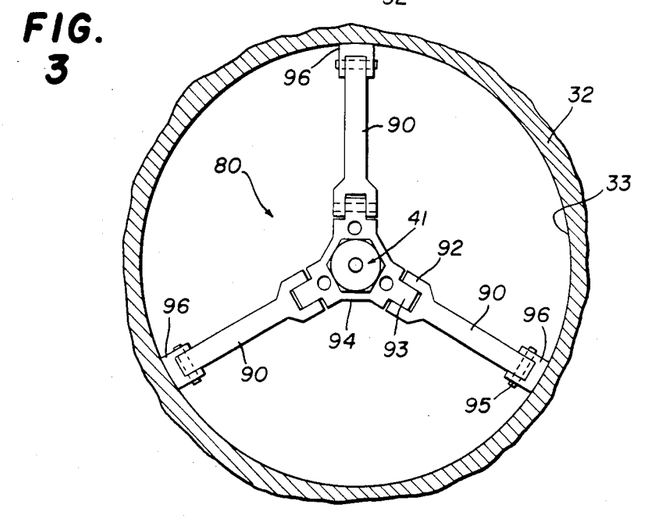
FIG. 3 is a reduced sectional view taken along the line 3—3 in FIG. 2, and illustrating the anchor end of the nozzle dam in plan view.
Figures 4, 5:
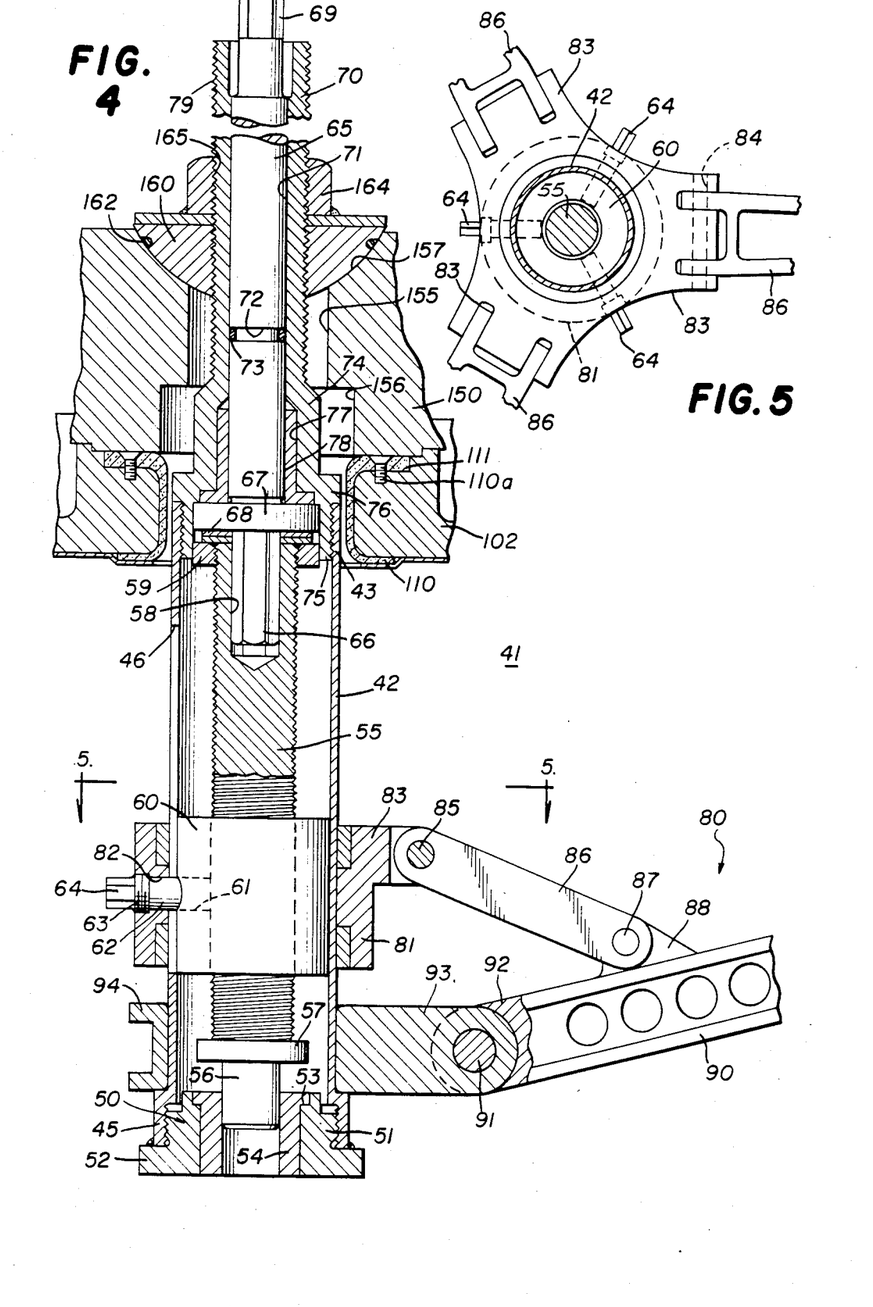
FIG. 4 is an enlarged fragmentary sectional view of the central shaft assembly of the nozzle dam of FIG. 2.
FIG. 5 is a view in horizontal section taken along the line 5—5 in FIG. 4.

Referring now to FIGS. 2 through 7 of the drawings, there is illustrated a nozzle dam, generally designated by the numeral 40, constructed in accordance with and embodying the features of a first embodiment of the present invention. The nozzle dam 40 includes a shaft assembly 41 on which is mounted an anchor assembly 80 for anchoring the nozzle dam 40 to the inner surface of the nozzle, and a seal assembly 100 for providing a fluid-tight closure of the nozzle. Referring in particular to FIGS. 2, 4 and 5, the shaft assembly 41 includes a cylindrical outer sleeve 42 having an internally threaded portion 43 at one end thereof and an internally threaded enlarged-diameter portion 45 at the other end thereof. Formed in the outer sleeve 42 and extending longitudinally thereof at three equiangularly spaced-apart positions therearound are three elongated slots 46. Fitted in the lower end of the outer sleeve 42 is a thrust retainer ring 50 having an externally threaded body 51 threadedly engaged with the enlarged-diameter portion 45 of the outer sleeve 42. The body 51 is provided at its lower end with a radially outwardly extending annular flange 52 which is disposed for engagement with the adjacent end of the outer sleeve 42. The thrust retainer ring 50 defines a bore therethrough, having a recessed upper end 53 in which is seated an annular thrust bearing 54 coaxially therewith.

Disposed within the outer sleeve 42 coaxially therewith is an elongated externally threaded drive screw 55 having a reduced-diameter unthreaded lower end 56 dimensioned to be coaxially rotatably received in the thrust bearing 54. The drive screw 55 is provided with an enlarged-diameter annular flange 57 disposed for engagement with the upper end of the thrust bearing 54 to limit the insertion of the reduced end 56 thereinto. The upper end of the drive screw 55 is provided with an axial bore 58 therein substantially hexagonal in transverse cross section. Fixedly secured to the upper end of the drive screw 55, as by welding, is a radially outwardly extending annular bearing collar 59.

Disposed within the outer sleeve 42 in surrounding relationship with the drive screw 55 and threadedly engaged therewith is a cylindrical travel nut 60 having three radial bores 61 extending thereinto at equiangularly spaced apart points therearound. Respectively received in the bores 61 are three pins 62, each having an externally threaded portion 63 and a hexagonal outer end 64, the bores 61 being positioned so that the pins 62 respectively extend outwardly through the slots 46 in the outer sleeve 42. Thus, it will be appreciated that the pins 62 cooperate with the slots 46 to prevent rotation of the travel nut 60 with respect to the outer sleeve 42, while accommodating longitudinal movement of the travel nut 60 with respect to the outer sleeve 42. Thus, rotation of the drive screw 55 will affect a corresponding longitudinal movement of the travel nut 60, this movement being limited by the length of the slots 46.

The shaft assembly 41 also includes an elongated torque shaft 65 having a hexagonal lower end 66 dimensioned for insertion into the hexagonal bore 58 in the upper end of the drive screw 55. Thus, it will be appreciated that rotation of the torque shaft 65 effects a corresponding rotation of the drive screw 55. Formed on the torque shaft 65 at the upper end of the hexagonal end 66 is an enlarged-diameter annular bearing flange 67 which has an outer diameter substantially the same as that of the bearing collar 59 on the drive screw 55. Disposed in surrounding relationship with the hexagonal end 66 of the torque shaft 65 are two Belleville springs 68 which are disposed in use between the bearing collar 59 and the bearing flange 67. The upper end of the torque shaft 65 has a hexagonal reduced-diameter tip 69.

Telescopically slidably received over the torque shaft 65 is a cylindrical torque tube 70 having a cylindrical bore 71 therethrough of a diameter very slightly greater than the external diameter of the torque shaft 65. An annular groove 72 is formed in the outer surface of the torque shaft 65 intermediate the ends thereof, an 0-ring 73 being seated in this groove and providing a fluid-tight seal between the torque shaft 65 and the torque tube 70. The torque tube 70 has an enlarged-diameter lower end 74 provided with an externally threaded cylindrical portion 75 dimensioned to be threadedly engaged with the threaded portion 43 of the outer sleeve 42 and to be received in surrounding relationship with the bearing collar 59 and the bearing flange 67. Thus, the torque tube 70 is immovably fixed to the outer sleeve 42. Extending radially outwardly from the enlarged diameter portion 74 is an annular shoulder 76 disposed for engagement with the upper end of the outer sleeve 42. The enlarged end 74 of the torque tube 70 has a cylindrical recess 77 formed therein for receiving a thrust bearing 78 which engages the bearing flange 67. The portion of the torque tube 70 above the enlarged diameter end 74 is provided with external threads 79.

Referring now in particular to FIGS. 2-5, the anchor assembly 80 includes an annular carriage 81 which is disposed in coaxial surrounding relationship with the outer sleeve 42 and is slidably movable longitudinally thereof. Extending radially through the carriage 81 are three cylindrical bores 82 (see FIG. 4) for respectively receiving the pins 62. More particularly, the bores 82 are respectively aligned with the bores 61 in the travel nut 60, and the pins 62 are respectively inserted into the bores 82, the externally threaded portion 63 being threadedly engaged with complementary internally threaded portions in the bore 82 fixedly to mount the pins 62 in place in positions with the inner ends thereof projecting into the bores 61 in the travel nut 60. In this mounted configuration, the hexagonal tips 64 of the pins 62 project radially outwardly from the carriage 81. Thus, it will be appreciated that the carriage 81 is locked to the travel nut 60 and moves therewith longitudinally of the outer sleeve 42 and the drive screw 55.

The carriage 81 is provided, respectively between adjacent ones of the pins 62, with three radially outwardly extending sets of clevis arms 83, each set having aligned holes 84 therethrough for receiving a corresponding pivot pin or bolt 85 for pivotally coupling thereto the adjacent end of a corresponding one of three links 86. The outer ends of the links 86 are respectively pivotally coupled, as by pivot pins or bolts 87, to ears 88 respectively formed intermediate the ends of three elongated legs 90. Each of the legs 90 is provided at its inner end with a pair of clevis arms 92 which are coupled, as by a pivot pin or bolt 91, to a corresponding one of three lugs 93 radially outwardly extending from an annular collar 94 disposed in surrounding relationship with the outer sleeve 42 and in abutting engagement with the enlarged-diameter end 45 thereof. The outer ends of the legs 90 are respectively pivotally coupled, as by pins or bolts 95, to three anchor feet 96, each being provided with a friction pad 97 adapted for frictional engagement with the cylindrical inner surface 33 of the associated nozzle 30 or 31.

While, in the drawings, the nozzle dam 40 has been illustrated as disposed in the nozzle 31, it will be appreciated that such a nozzle dam 40 will be disposed in each of the nozzles 30 and 31 and the following discussion applies equally to either type of nozzle.

Referring now in particular to FIGS. 2, 6, 7, 10 and 12 the seal assembly 100 includes a foldable circular seal plate 101, having a center section 102 hingedly connected to two side sections 112. Each of the sections 102 and 112 is provided with a plurality of lightening recesses in the upper surface thereof, resulting in a waffle-type construction. The center section 102 has generally parallel top and bottom surfaces 103 and 105, the top surface 103 having a rectangular recessed portion 104 therein centrally thereof. The center section 102 has parallel side surfaces 106 interconnected by arcuate end surfaces. Formed in each of the side surfaces 106 is an elongated seal groove 107 which extends longitudinally thereof parallel to the top surface 103 and has upturned ends adjacent to the opposite ends of the side surface 106 which extend upwardly to the top surface 103. Fitted in each of the seal grooves 107 is a resilient seal member 108. The center section 102 has formed therethrough a central cylindrical bore 109 is an annular seal member 110 which lines the bore 109 and has upper and lower radially outwardly extending flanges, the upper one of which is seated in a complementary recess 111 and is fixedly secured in place by suitable fasteners 110a (FIG. 4).

Figures 6, 7:
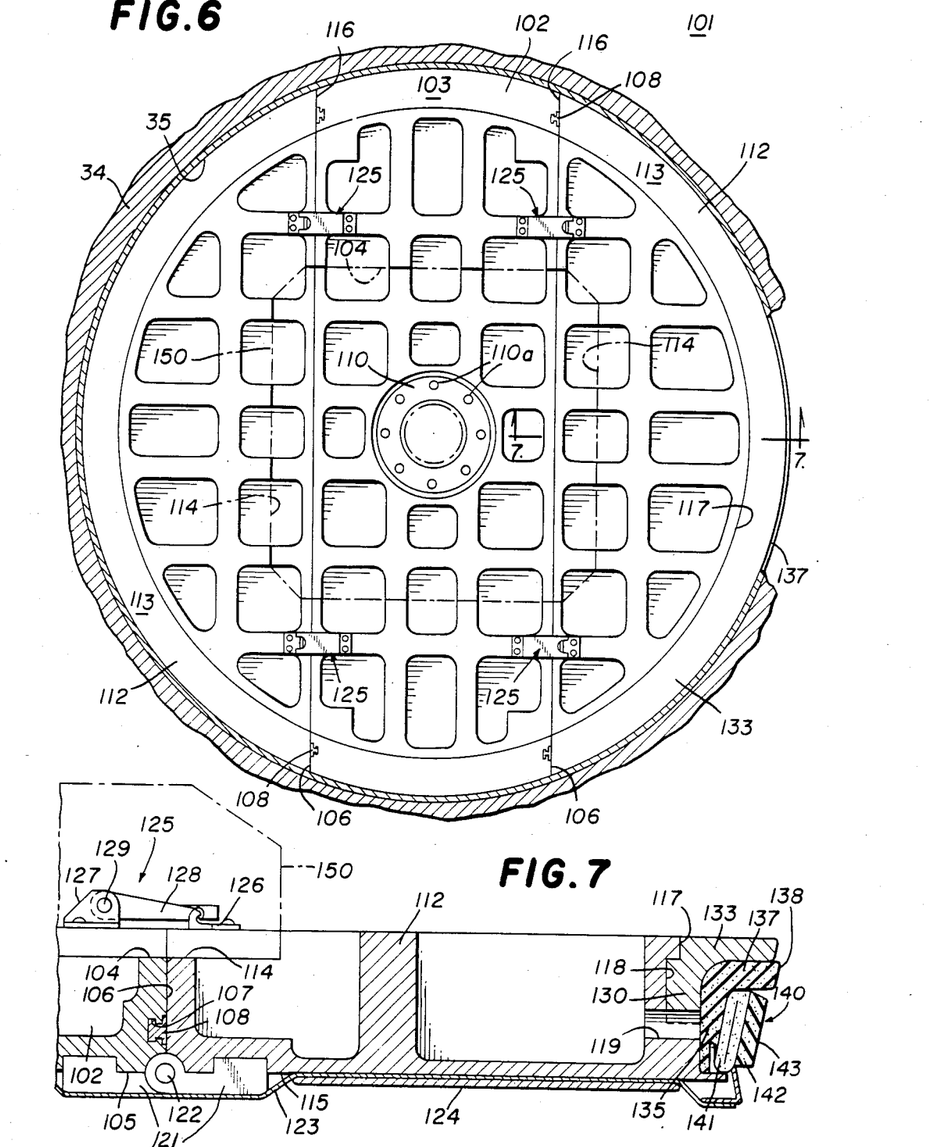
FIG. 6 is a top plan view of the nozzle dam of FIG. 2, with the retainer block removed.
FIG. 7 is an enlarged fragmentary view in vertical section taken along the line 7—7 in FIG. 6.
Figure 12:
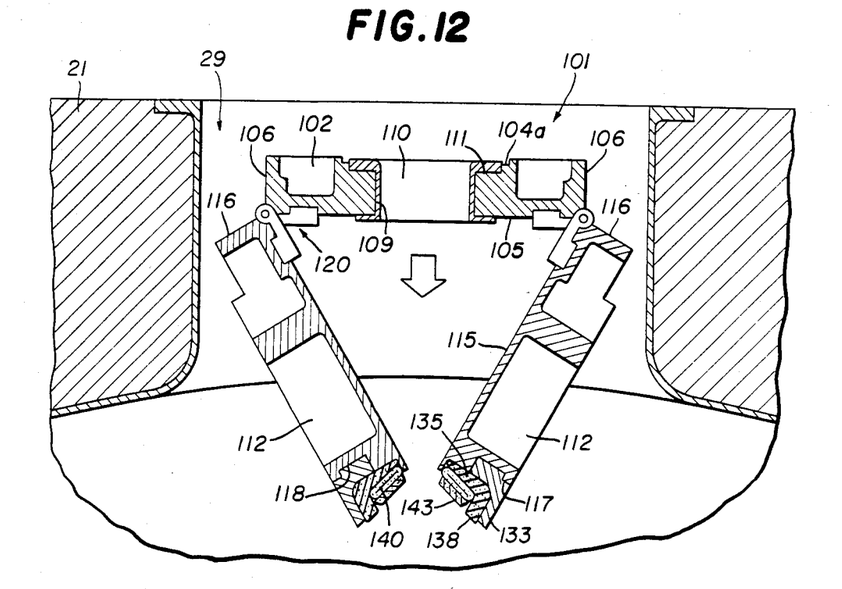
FIG. 12 is a view similar to FIG. 11, illustrating the seal assembly of the nozzle dam folded and oriented coaxially with the manway for passage therethrough.

Each of the side sections 112 has substantially parallel top and bottom surfaces 113 and 115 (FIGS. 6 and 12). The inner edge of each top surface 113 has a recessed portion 114 dimensioned so that when the seal plate 101 is disposed in its flat sealing condition, the recessed portions 114 respectively join the opposite sides of the recessed portion 104 in the center section 102 to form a single enlarged generally square recess centrally of the seal plate 101. Each of the side sections 112 has an elongated flat side surface 116 adapted for mating engagement with an associated one of the side surfaces 106 on the center section 102. The side sections 112 respectively have arcuate outer surfaces which are dimensioned to be continuous with the arcuate end surfaces of the center section 102 to form a continuous cylindrical peripheral surface 117 when the seal plate 101 is disposed in its flat sealing condition. Formed in the peripheral surface 117 around the entire perimeter of the seal plate 101 is a recess 18. Extending through the peripheral surface 117 on each of the sections 102 and 112 is at least one inflation bore 119 (FIG. 7) for a purpose to be explained more fully below.

The center section 102 is connected respectively to the two side sections 112 by two hinge assemblies 120. Each of the hinge assemblies 120 includes a plurality of pairs of hinge plates 121, with the plates 121 of each pair being respectively fixedly secured to the bottom surfaces 105 and 115 of the center section 102 and the adjacent side section 112. The hinge plates 121 have aligned bushings for receiving therethrough a hinge pin 122, thereby providing a piano-type hinge for permitting the side sections 112 to be foldably pivoted with respect to the center section 102 between a flat sealing condition illustrated in FIGS. 6 and 7 and a folded position illustrated in FIG. 12. Overlying the entire bottom of the seal plate 101, including the hinge assemblies 120 is a resilient seal sheet 123, held in place by retainer plates 124. The seal plate 101 is held in its flat sealing condition by four latch assemblies 125 (FIGS. 6 and 7). Each of the latch assemblies 125 includes a keeper 126 fixedly secured to the top surface 113 of the associated side section 112 and a mounting bracket 127 fixedly secured to the top surface 103 of the center section 102. A latch member 128 is pivotally mounted on the mounting bracket 127, as by a pivot pin 129, for pivotal movement into latching engagement with the associated keeper 126.

Arcuate mounting shoe sections 130 are respectively fixedly secured to the sections 102 and 112 at the peripheral surface 117 of the seal plate 101, as by screws 132 (FIG. 2). The mounting shoe sections 130 cooperate to define an annular mounting shoe which extends circumferentially around the entire seal plate 101. This mounting shoe includes a radially outwardly extending annular flange 133 (FIG. 7), the upper surface of which is substantially coplanar with the top surfaces 103 and 113 of the seal plate 101.

Fixedly secured to the mounting shoe sections 130 is an arcuate fixed seal member 135 which is preferably formed of a compressible resilient material such as EPDM, the seal member 135 operating when the seal plate 101 is in its flat sealing condition to form a continuous annular seal extending circumferentially around the entire seal plate 101. The seal member 135 has a radially outwardly extending annular flange 137 which is disposed just beneath the flange 133 of the corresponding mounting shoe section 130, the flange 137 projecting a slight distance radially outwardly beyond the distal end of the flange 133 and being provided with a frustoconical seal surface 138. It will be appreciated that the seal member 135 has formed therethrough a radial bore (not shown) disposed in alignment with the corresponding bore 119 in the associated section of the seal plate 101 for a purpose to be described below.

The seal assembly 100 also includes an inflatable seal 140, including an inflatable bladder 141 fixedly secured to the outer surface of the fixed seal member 135 immediately beneath the flange 137 thereof. The bladder 141 is generally in the form of a flattened torus and has an inflation fitting (not shown) which is coupled by a suitable conduit (not shown) extending through the associated inflation bore 119 and the bore through the fixed seal member 135 to a source of compressed air or other suitable inflation fluid. Fixedly secured to the outer surface of the bladder 141 along the entire outer peripheral extent thereof is a seal member 142 which is formed of a compressible resilient material, such as EPDM, and has a frustoconical sealing surface 143 disposed substantially parallel and coaxial with the sealing surface 138. Upon inflation, the bladder 141 expands radially outwardly, to drive the seal surface 143 into sealing engagement with the frustoconical inner surface 35 of the associated nozzle 30 or 31 (see FIG. 2).

Referring in particular to FIGS. 2, 4, 6 and 7, the seal assembly 100 also includes a generally rectangular retainer block 150 having substantially parallel bottom and top surfaces 151 and 153. The bottom surface 151 is dimensioned to be seated in the generally rectangular recess defined by the recessed portions 104 and 114 of the seal plate 101 when it is disposed in its flat sealing condition. Depending from the bottom surface 151 centrally thereof is an annular seal surface 152 which is disposed for fluid-tight sealing engagement with the upper annular flange of the seal member 110 in the seal plate 101. The retainer block 150 has a central cylindrical bore 155 therethrough having an enlarged diameter portion 156 at the lower end thereof and having a part-spherical recess 157 at the upper end thereof communicating with the top surface 153. In use, when the retainer block 150 is seated in the recess on the seal plate 101, the bore 155 is disposed coaxially with the bore 109 in the seal plate 101 for cooperation therewith to receive therethrough the upper portion of the shaft assembly 41, as is best illustrated in FIGS. 2 and 4.

In order to secure the retainer block 150 in place on the seal plate 101, there is provided a partspherical locknut 160 dimensioned to be seated in the part-spherical recess 157 of the retainer block 150. The locknut 160 has an annular groove 161 extending circumferentially therearound (see FIG. 10), in which is seated a seal ring 162 to provide a fluid-tight seal between the locknut 160 and the part-spherical surface of the retainer block recess 157. The locknut 160 has a flat circular top surface 163 which carries a hexagonal drive portion 164 centrally thereof. Extending axially through the locknut 160 is an internally threaded bore 165 for threaded engagement with the torque tube 70. Preferably, the locknut 160 is machined as a single piece.

Figure 11:
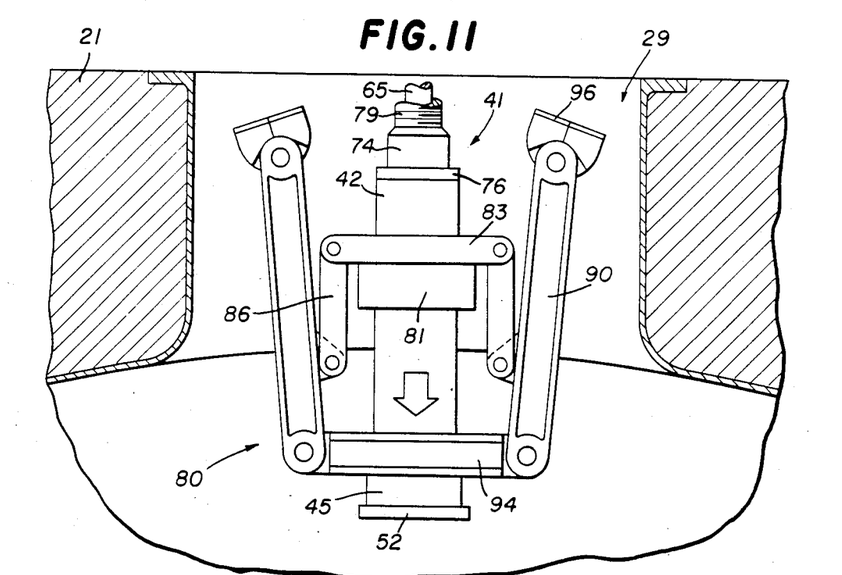
FIG. 11 is a fragmentary sectional view of the manway of the nuclear steam generating vessel of FIG. 1, illustrating the nozzle dam shaft and anchor assembly folded for passage therethrough.

Referring to FIGS. 11 and 12, it is a significant aspect of the present invention, that both the anchor assembly 80 and the seal assembly 100 are foldable. This is important because the nozzle dam 40 must be applied to the nozzle 30 or 31 from inside the associated plenum 26 or 27, and the only access to these plena are afforded by the manways 29, which have a diameter substantially less than that of the nozzles 30 and 31. Accordingly, the nozzle dam 40 cannot be inserted into the nuclear steam generator vessel in its assembled condition, nor can the seal plate 101 be inserted in its flat sealing condition. However, when the seal plate 101 is folded to its folded condition, as described above, it will fit through the manway 29, as illustrated in FIG. 12. Similarly, the anchor assembly 80 is foldable by rotation of the drive screw 55 to pull the travel nut 60 and the carriage 81 to their fully raised positions, with the pins 62 engaging the upper ends of the slots 46, as illustrated in FIG. 11. In this condition, the links 86 are disposed substantially parallel to the longitudinal axis of the shaft assembly 41, and the legs 90 are folded upwardly, so that the combination of the anchor assembly 80 and the shaft assembly 41 can readily pass through the manway 29. The retainer block 150 and the locknut 160 are dimensioned so that they can easily pass through the manway 29.

Figure 8:
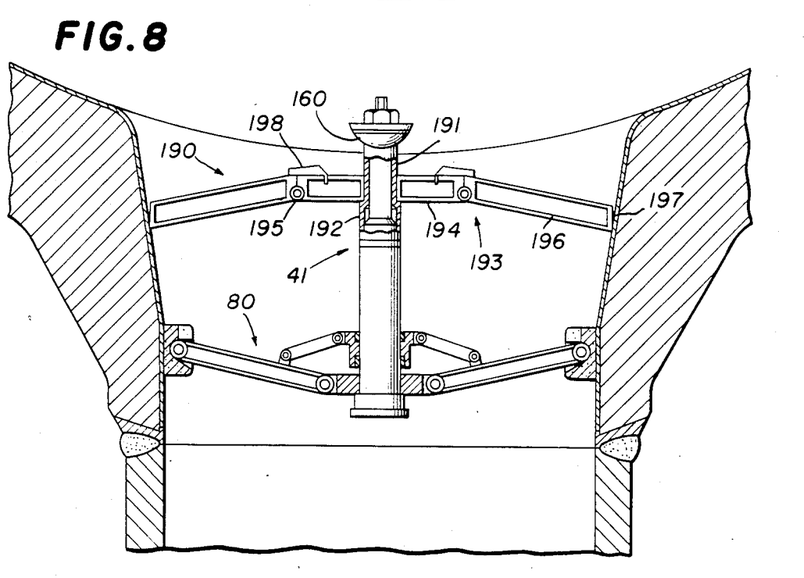
FIG. 8 is a reduced view similar to FIG. 2, and illustrating a centering mechanism utilized in installation of the nozzle dam of FIG. 2.
Figure 9:
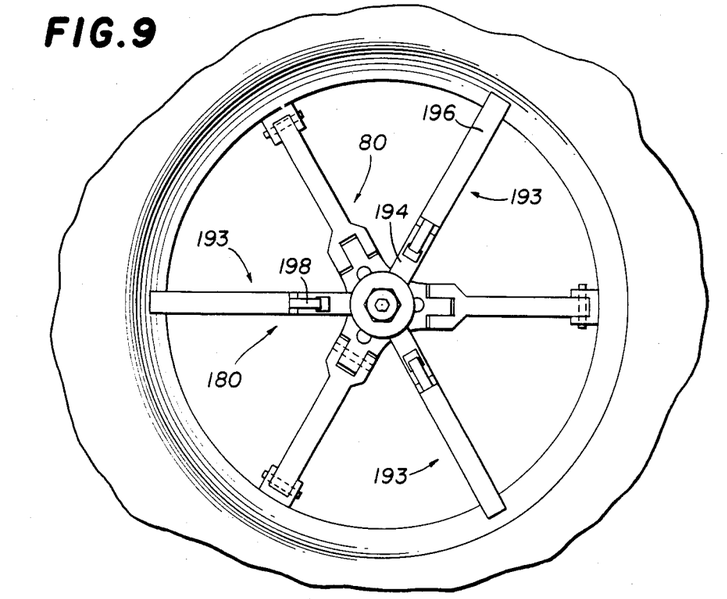
FIG. 9 is a top plan view of the centering mechanism of FIG. 8.

Referring now to FIGS. 8 and 9 of the drawings, there is illustrated a centering mechanism 190 for use in installation of the nozzle dam 40. The centering mechanism 190 includes an elongated hollow tube 191 having an enlarged-diameter end portion 192. Fixedly secured to the tube 191 and extending radially outwardly therefrom immediately above the enlarged-diameter portion 192 at equiangularly spaced apart points therearound are three hinged centering arms 193. Each of the centering arms 193 includes an inner portion 194 fixedly secured to the tube 191 and extending substantially perpendicular to the axis of the tube 191, and an elongated outer end 196, the portions 194 and 196 being interconnected by a hinge 195. Each outer end 196 terminates in a bearing tip 197 disposed for engagement with the frustoconical inner surface 35 of the nozzle 30 or 31. The outer ends 196 are foldable between a folded position extending downwardly generally parallel to the axis of the tube 191 (not shown) and a centering position, illustrated in FIGS. 8 and 9, in which the outer ends 196 are inclined laterally outwardly and downwardly with respect to the inner portions 194. Latches 198 are provided for securing the outer ends 196 in their centering position.

The operation of the nozzle dam 40 will now be described in detail. Initially, the several parts of the nozzle dam 40 are separately inserted through the associated manway 29 in the manner described above, the seal plate 101 and the anchor assembly 80 being folded for this purpose. Next, the centering mechanism 190 is mounted on the shaft assembly 41, the tube 191 being fitted down over the torque tube 70, with the enlarged-diameter portion 192 accommodating the enlarged portion 74 of the torque tube 70. The hinged centering arms 193 of the centering mechanism 190 are latched in their extended centering conditions. Next, the shaft assembly 41 is inserted into the nozzle 30 or 31, with the anchor assembly 80 facing the outer end of the nozzle 31. The bearing tips 197 of the centering mechanism 190 will engage the frustoconical inner surface 35 of the nozzle, as indicated in FIG. 8, to center the inner end of the shaft assembly 41 with respect to the nozzle. The torque shaft 65 is rotated by means of a suitable tool applied to the hexagonal tip 69 for unfolding the legs 90 of the anchor assembly 80 until the anchor feet 96 are disposed in tight engagement with the cylindrical inner surface 33 of the nozzle 31 for holding the anchor assembly 80 and the shaft assembly 41 in place and centering the outer end of the shaft assembly 41. The centering mechanism 190 is then removed.

The seal plate 101 is then unfolded to its flat sealing condition and latched in that condition by closure of the latch assemblies 125. The seal plate 101 is then fitted down over the inner end of the shaft assembly 41, until the seal surface 138 of the fixed seal member 135 engages the frustoconical inner surface 35 of the nozzle 31. In this regard, it will be noted that the bore 109 and the seal member 110 in the seal plate 101 are dimensioned so that the seal plate 101 will fit freely down over the inner end of the outer sleeve 42. The retainer block 150 is then fitted down over the inner end of the shaft assembly 41 and seated in the recess in the top surface of the seal plate 101, with the annular seal surface 152 disposed in sealing engagement with the seal member 110. The locknut 160 is then threaded down on the inner end of the torque tube 70 until it is firmly seated in the part-spherical recess 157 in the retainer block 150, to hold the retainer block 150 in engagement with the seal plate 101. Next an air supply is connected to the inflatable seal 140 by a suitable conduit and fitting (not shown). When the parts are assembled, the nozzle dam 40 is firmly seated in the nozzle 30 or 31, but is not sufficiently anchored so as to be able to withstand significant pressure differentials on opposite sides of the seal plate 101, since the mounting has been accomplished to this point simply by the use of manual tools applied to the torque shaft 65 and the locknut 160.

Figure 10:
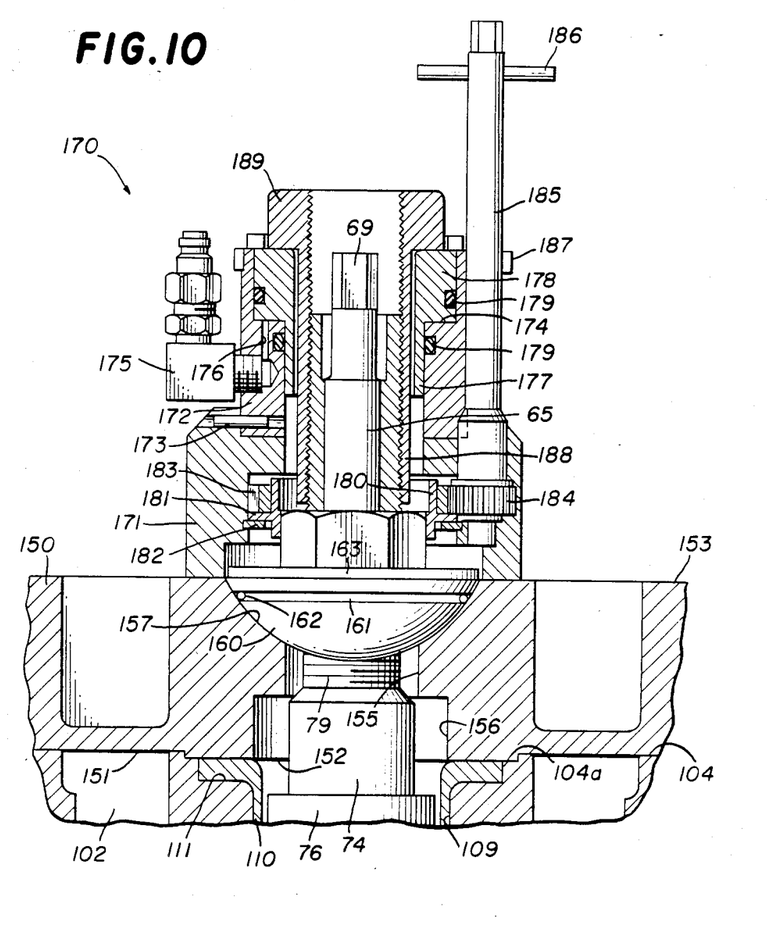
FIG. 10 is an enlarged fragmentary view of the upper portion of the shaft assembly of FIG. 2, illustrating a tensioning unit mounted in position thereon.

In order to more securely mount the nozzle dam 40 in place, there is provided a tensioning assembly 170. Referring to FIG. 10, the tensioning assembly 170 includes an annular block 171 which is fitted down over the inner end of the shaft assembly 41 and the locknut 160 and is seated against the top surface 153 of the retaining block 150. Seated in a recess in the upper end of the annular block 171 is an annular outer ring 172, which is fixedly secured to the annular block 171 by suitable roll pins 173. The outer ring 172 has an annular shoulder 174 therein. Formed in the outer surface of the outer ring 172 is a chamber receiving therein a hydraulic fitting 175. A short axial passage 176 provides communication between the hydraulic chamber and the annular shoulder 174. Disposed coaxially within the outer ring 172 is an annular inner ring 177 having an enlarged-diameter upper portion 178 which is seated on the shoulder 174 of the outer ring 172. O-rings 179 are seated in complementary annular grooves in the outer surface of the inner ring 177 and the inner surface of the outer ring 172 providing fluid-tight seals between the outer and inner rings 172 and 177 while accommodating axial relative sliding movement thereof.

A hexagonal socket member 180 is disposed within the annular block 171, being held in position between a shoulder on the block 171 and an annular retaining flange 181. The socket member 180 is disposed to be fitted down over the hexagonal drive stud 164 of the locknut 160 in driving relationship therewith when the annular block 171 is seated on the retainer block 150, the socket member 180 being disposed for free rotational movement with respect to the annular block 171. Fixedly secured to the outer surface of the socket member 180 is a gear member 183 which is disposed in meshing engagement with a gear 184 fixedly secured adjacent to one end of a shaft 185 which is rotatably disposed in a complementary bore in the annular block 171. The shaft 185 extends substantially parallel to the longitudinal axis of the shaft assembly 41 and projects well beyond the inner end thereof, being provided at its distal end with a transverse handle 186 for permitting manual rotation of the shaft 185. The shaft 185 is retained in place with respect to the outer ring 172 by a retaining ring 187. A cylindrical lock tube 188 is telescopically received between the inner ring 177 and the torque tube 70, being threadedly engaged with the latter. The lock tube 188 is provided at its upper end with an enlarged-diameter annular head 189, disposed for abutting engagement with the adjacent end of the inner ring 177, securely to hold the tensioning assembly 170 in place against the retainer block 150, while still permitting access to the reduced hexagonal tip 69 of the torque shaft 65.

In operation, the tensioning assembly 170, with the exception of the lock tube 188, is fitted down over the inner end of the shaft assembly 41 and against the retainer block 150, as illustrated in FIG. 10. The lock tube 188 is then screwed on to the torque tube 70 until the annular head 189 engages the upper end of the inner ring 177. The hydraulic fitting 175 is coupled to an associated source of pressurized hydraulic fluid, which is then applied to the tensioning assembly 170. The air flows through the passage 176 and pneumatically drives the outer and inner rings 172 and 177 axially in opposite directions.

More specifically, the outer ring 172 is driven against the annular block 171, which in turn drives the retainer block 150 against the seal plate 101 for moving it axially of the shaft assembly 41 and outwardly of the nozzle 30 or 31. Thus, the seal surface 138 is driven more firmly into sealing engagement with the frustoconical inner surface 35 of the nozzle 30 or 31, compressing the flange 137 until the outer edge of the flange 133 on the mounting shoes 130 firmly engages the frustoconical inner surface 35 of the nozzle 30 or 31.

At the same time, the inner ring 177 is driven against the annular head 189 of the lock tube 188 which is fixedly secured to the shaft assembly 41. Thus, the shaft assembly 41 is pulled inwardly of the nozzle 30 or 31, the enlarged-diameter end 45 of the outer sleeve 42 engaging the collar 94 of the anchor assembly 80 for pulling it inwardly toward the carriage 81. This axial inward movement of the collar 94, tends to straighten out the legs 90, driving the anchor feet 96 and the friction pads 97 thereon more firmly into engagement with the cylindrical inner surface 33 of the nozzle 30 or 31. Thus, it will be appreciated that the tensioning assembly 170 serves simultaneously to pneumatically tighten both the anchor assembly 80 and the seal assembly 100.

When the nozzle dam 40 has been sufficiently tightened in this manner, the shaft 185 is manually rotated for rotating the socket member 180 and driving the locknut 160 down firmly against the retainer block 150, securely to lock the retainer block 150 with respect to the shaft assembly 41. The tensioning assembly 170 may then be removed. A seal cap (not shown) may then be screwed down over the inner end of the torque tube 70, sealing the inner end of the shaft assembly 41.

When the parts have been thus assembled and securely tensioned in position, compressed air is applied to the inflatable seal 140 for inflating the bladder 141 to about 60 PSIG and pneumatically driving the seal surface 143 into firm frictional engagement with the frustoconical inner surface 35 of the nozzle 30 or 31. This pneumatic pressure is continued as long as the nozzle dam 40 is in place.

It is a significant feature of the present invention that the above-described construction of the nozzle dam 40 permits it to be securely mounted on the inner surface of the nozzle 30 or 31, without the use of any attachment means, and without any modification of the nozzle itself. Furthermore, this arrangement permits a very secure mounting of the nozzle dam 40, which will sustain relatively large pressure differentials between the opposite sides of the seal assembly 100.

Another important advantage of this arrangement is that it provides two separate seals for closing the nozzle 30 or 31. The first seal is the inflatable seal 140, which cooperates with the seal sheet 123, the seal member 110, the ring 162 and the seal cap for providing a fluid-tight closure of the nozzle 30 or 31. The seal members 108 serve to prevent fluid flow laterally between the seal plate sections 102 and 112. The second seal is a fixed or static seal and is provided by the fixed seal member 135, which serves as a backup for the inflatable seal 140.

Thus, in the event that air pressure to the inflatable seal 140 should be lost for any reason, fluid-tight closure of the nozzle 30 or 31 would still be maintained by the fixed or static seal.

Another important advantage of the present invention is that it can sustain significant pressure heads on either side of the nozzle dam 40. In the event that the pressure inside the steam generator vessel 21 is greater than that in the conduit 38, the pressure head will force the seal assembly 100 into more firm wedging engagement with the frustoconical inner surface 35 of the nozzle 30 or 31. No movement of the seal assembly 100 will be effected, since the mounting shoes 130 are already in engagement with the inner surface 35 of the nozzle.

If, on the other hand, the pressure in the conduit 38 is greater than that in the steam generator vessel 21, the pressure will tend to move the seal plate 101 inwardly of the vessel 21 in an unsealing direction. But significant movement in this direction is prevented by the anchor assembly 80. More specifically, since the seal plate 101 is fixedly coupled to the shaft assembly 41 via the retainer block 150 and the locknut 160, any tendency of the seal plate 101 to move inwardly of the nozzle 30 or 31 will tend to produce a corresponding inward movement of the shaft assembly 41. This will tend to drive the inner ends of the arms 90 inwardly, increasing the frictional pressure between the anchor feet 96 and the cylindrical inner surface 33 of the nozzle 30 or 31. But because the anchor assembly have already been pretightened by the tensioning assembly 170, no significant inward movement of the shaft assembly 41 is possible.

Furthermore, it will be noted that in mounting the seal assembly 100 in place, the seal flange 137 of the fixed seal member 135 was compressed slightly. Thus, a slight movement of the seal plate 101 inwardly of the nozzle 30 or 31 could be accommodated while still maintaining sealing relationship between the seal member 135 and the inner frustoconical surface 35 of the nozzle. This allowable movement is greater than the movement of the shaft assembly 41 which would be permitted by the anchor assembly 80, thereby effectively to maintain the seal even in the event of a pressure head outside the nozzle dam 40. In this regard, it will be appreciated that the inflatable seal 140 can accommodate even greater axial movement of the seal plate 101 without losing sealing contact with the frustoconical inner surface 35 of the nozzle 30 or 31.

Figure 13:
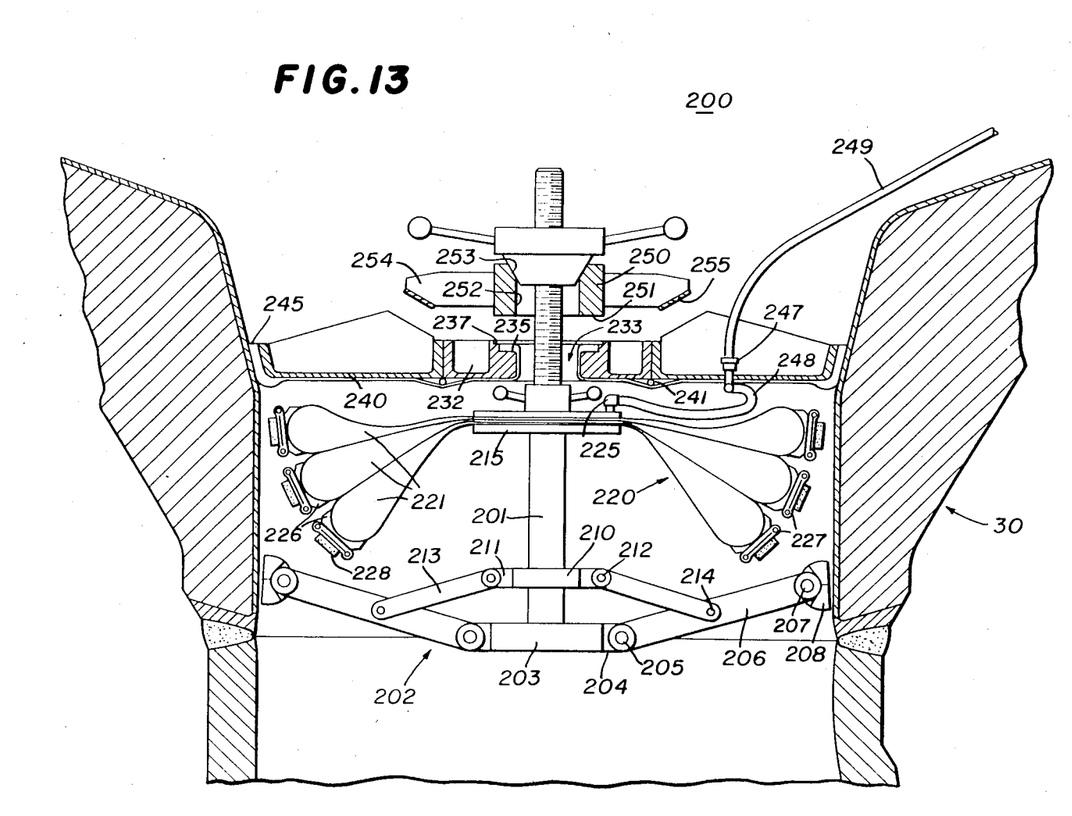
FIG. 13 is a reduced view similar to FIG. 2, illustrating a nozzle dam constructed in accordance with and embodying the features of the second embodiment of the present invention, illustrated partially assembled during the mounting operation.
Figure 14:
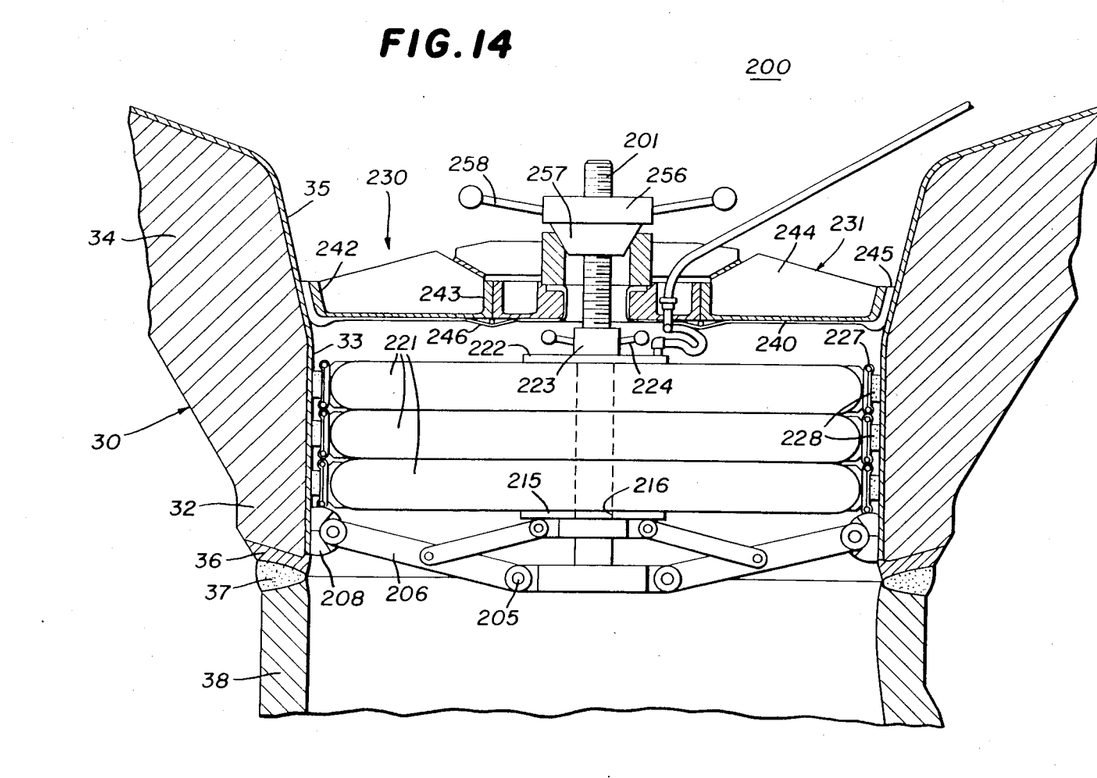
FIG. 14 is a view similar to FIG. 13, illustrating the nozzle dam thereof mounted in position in the nozzle.

Referring now also to FIGS. 13 and 14 of the drawings, there is illustrated a nozzle dam 200, constructed in accordance with and embodying the features of a second embodiment of the present invention. This embodiment also includes two seal mechanisms, including an inflatable seal and a fixed or static seal, but in this case the two seals are not fixedly secured to one another and can, in fact, be used independently of each other, as well as in combination.

The nozzle dam 200 includes an elongated externally threaded shaft 201 fixedly secured at one end thereof to an anchor assembly 202. More specifically, the shaft 201 is secured to a base plate 203 provided with three equiangularly spaced apart radially outwardly extending sets of clevis arms 204 (two sets shown). Each of the clevis arms 204 is pivotally secured, as by a pivot pin or bolt 205, to the inner end of an elongated leg 206, the outer end of which is pivotally secured, as by a bolt or pin 207, to an anchor foot 208, thereby to provide a tripod arrangement. The anchor assembly 202 also includes an annular collar 210 disposed in surrounding relationship with the shaft 201 and freely movable longitudinally thereof. The collar 210 is provided with three sets of radially outwardly extending clevis arms 211, each being pivotally coupled, as by a pivot pin or bolt 212, to the inner end of a link 213, the outer end of which is pivotally coupled, as by a pivot pin or bolt 214, to an associated one of the legs 206 intermediate the ends thereof. Thus, it will be appreciated that as the collar 210 is moved axially of the shaft 201, the anchor assembly 202 is moved between an expanded mounting position illustrated in FIG. 14 and a folded position (not shown) similar to that illustrated in FIG. 11, and for the same purpose.

The nozzle dam 200 includes an inflatable seal assembly 220 mounted on the shaft 201. The inflatable seal assembly 220 includes a lower circular bearing plate 215 having a cylindrical bore 216 centrally thereof to accommodate the shaft 201 therethrough and permit free sliding movement of the bearing plate 215 longitudinally of the shaft 201. Three inflatable bladders 221 are provided and are fixedly secured together, each of the bladders 221 being generally in the shape of a torus having a small central opening for accommodating the shaft 201 therethrough and disposable in sealing engagement therewith. The lower one of the bladders 221 is secured to the bearing plate 215, while the upper one of the bladders 221 is fixedly secured to an upper bearing plate 222, which is also movable axially along the shaft 201. Preferably, each of the bladders 221 has internal cross threads or cords, much as in a pneumatic tire, so that upon inflation, the bladders fundamentally simply become rigid, but do not stretch.

Overlying the upper bearing plate 222 is a nut 223 which is threadedly engaged with the shaft 201 and is provided with handles 224. The upper bearing plate 222 is provided with a pneumatic fitting 225, which communicates with the interior of the bladders 221. Fixedly secured to each of the bladders around the perimeter thereof are mounting rings 226, each of which carries thereon an annular radially inflatable bladder 227. Fixedly secured to the outer surface of each of the bladders 227 is a compressible seal ring 228 disposable in frictional sealing engagement with the cylindrical inner surface 33 of the associated nozzle 30 or 31.

The nozzle dam 200 also has a fixed seal assembly 230 which includes a foldable seal plate 231. The seal plate 231 includes a center section 232 and two side sections 240 which are hingedly interconnected. The center section 232 has a circular bore 233 therethrough in which is seated an annular seal member 235 having upper and lower radially outwardly extending flanges, the upper one of which is seated in a recess in the top surface of the center section 232. The side sections 240 are coupled to the center section 232 by hinge assemblies 241, which may be substantially the same as the hinge assemblies 120 which were explained above in connection with the embodiment of FIGS. 2-12. Each of the seal sections 232 and 240 has arcuate peripheral walls 242 which cooperate to define an annular cylindrical wall encircling the seal plate 231 when it is disposed in its flattened sealing condition, illustrated in the drawings. Each of the seal plate sections 232 and 240 also includes upstanding parallel transverse side walls 243 adjacent to the hinge assemblies 241 and disposable in back-to-back engagement with each other when the seal assembly 230 is disposed in its flattened sealing condition. Interconnecting the peripheral walls 242 and the inner side walls 243 of the side sections 240 are radially extending transverse webs 244.

Fixedly secured to the outer surface of the peripheral walls 242 is a seal member 245 which operates to define an annular seal encircling the seal plate 231 when it is disposed in its flattened sealing condition. A seal sheet 246 underlies the seal plate 231 and closes it between the seal members 235 and 245. The seal plate 231 is provided with a pneumatic fitting 247 extending therethrough. The fitting 247 is connected to the fitting 225 by a conduit section 248 and is connected by a conduit 249 to an associated source of compressed air for inflating the bladders 221 and 227.

The nozzle dam 200 also includes an annular retaining block 250 which is receivable coaxially over the inner end of the shaft 201, and has a bottom surface 251 disposable in sealing engagement with the seal member 235. The retaining block 250 has a cylindrical bore 252 therethrough having a frustonical beveled portion 253 at the inner or upper end thereof. Extending radially outwardly from the retaining block 250 are a plurality of wings 254, each of which carries at its outer end an inclined bearing plate 255 disposable for bearing engagement with the inner end of the associated one of the transverse webs 244 on the seal plate 231 when it is disposed in its flattened sealing condition. A nut 256 is threadedly engageable with the shaft 201 and has a frustoconical portion 257 which is disposable in sealing engagement with the beveled portion 253 of the retaining block 250. In this regard, an O-ring (not shown) may be provided in a complementary groove in the frustoconical portion 257 to provide effective fluid-tight sealing between the nut 256 and the retaining block 250, in the same manner as was described above with respect to the nut 160 of the nozzle dam 40. The nut 256 is also provided with a plurality of outwardly extending handles 258 for manual operation thereof.

In operation, the parts of the nozzle dam 200 are separately inserted through the manway 29 for assembly in the nozzle 30 or 31, this insertion being facilitated by the foldability of the anchor assembly 202 and the fixed seal assembly 230, and by the flexibility of the inflatable seal assembly 220. Latch assemblies (not shown) may be provided for latching the seal plate 231 in its flattened sealing condition, in much the same manner as was described above with respect to the seal plate 101 of the nozzle dam 40.

When the parts have been disposed in the steam generator vessel 21, the inflatable seal assembly 220 is fitted over the shaft 201 and the nut 223 is screwed down to the desired position. Preferably, the inflatable seal assembly 220 is then inflated until the seal rings 228 are disposed in loose frictional engagement with the cylindrical inner surface 33 of the nozzle 30 or 31. This inflation serves to drive the lower bearing plate 215 into engagement with the collar 210, pushing it downwardly along the shaft 201 to spread the legs 206 of the anchor assembly 202 and move the anchor feet 208 into frictional engagement with the cylindrical inner surface 33 of the nozzle 30 or 31. The nut 223 can then be screwed to accurately position the parts and firmly clamp the bladders 221 between the upper and lower bearing plates 222 and 215. This initial and partial inflation may be accomplished by directly coupling the source of compressed air to the fitting 225, or may be effected through the conduits 248 and 249.

The fixed seal assembly 230 is then latched in its flattened sealing condition and fitted over the shaft 201 until the annular seal member 245 is disposed in frictional sealing engagement with the frustoconical inner surface 35 of the nozzle 30 or 31. The retaining block 250 and the nut 256 are then applied, the nut 256 being screwed down securely to compress the seal member 245 against the inner surface 35 of the nozzle 30 or 31. The inflatable seal assembly 220 may then be fully inflated to press the seal rings 228 into tight sealing engagement with the inner surface 33 of the nozzle 30 or 31, and to further urge the anchor assembly 202 into expanded frictional engagement with the inner surface 33. This air pressure is then maintained as long as the nozzle dam 200 is in place.

It will be appreciated that the nozzle dam 200 affords a secure closure of the nozzle 30 or 31 without any modification of the nozzle, and provides both primary and secondary seals. In this regard, the primary seal is provided by the bladders 221 and 227 and the seal rings 228. However, in the event of loss of air pressure, a secondary seal is still provided by the seal members 245 in cooperation with the seal sheet 246, the seal member 235 and the seal between the nut 256 and the retaining block 250.

It is further significant that the nozzle dam 200 can withstand significant pressure heads on either side thereof. A pressure head on the inner end of the nozzle will moved the fixed seal assembly 230 into tighter wedging engagement with the frustoconical inner surface 35 of the nozzle 30 or 31. If this pressure is felt by the bladder 221, they will be driven against the lower bearing plate 215, serving more firmly to anchor the anchor assembly 202.

A pressure head on the outer end of the nozzle 30 or 31 will tend to move the bladders 221 inwardly, but this movement will be resisted by the upper bearing plate 222, which is fixedly secured to the shaft 201. But significant inward movement of the shaft 201 is effectively prevented, since this movement will tend to expand the anchor assembly 202, further significant expansion in which is not possible. Thus, the pressure head will not move the shaft 201 sufficiently to break the seals of either the inflatable seal assembly 220 or the fixed seal assembly 230.

While the inflatable seal assembly 220 and the fixed seal assembly 230 of the nozzle dam 200 are intended to be used in combination described above, it will be appreciated that, with slight modifications, either could be used independently of the other, in combination with the shaft 201 and the anchor assembly 202. Thus, for example, the inflatable seal assembly 220 might be useful in certain applications where significant pressure differentials on the opposite sides thereof would not be experienced, or where loss of air pressure is not a concern.

From the foregoing, it can be seen that there has been provided an improved nozzle dam which is of simple and economical construction, provides an effective and secure closure of the nozzle without any modification thereof, provides a dual sealing capability, and which can be easily inserted into the steam generator vessel through a small-diameter manway.

We claim:

1. A foldable nozzle dam for preventing fluid flow through a primary fluid nozzle and the plenum of a nuclear steam generating vessel, said nozzle dam comprising: fluid-impermeable seal means including a plurality of hingedly interconnected sections foldable between a relatively compact access condition facilitating insertion into the steam generating vessel and an expanded sealing condition, said seal means in the sealing condition thereof being disposable within and extending across the nozzle for closing same in frictional engagement with the inner surface of the nozzle around the entire perimeter thereof to form a fluidtight seal; and anchor means separable from said seal means and movable between a relatively compact access configuration for facilitating insertion into the vessel and an expanded anchoring configuration, said anchor means including a base member disposed centrally of the nozzle, a plurality of anchor members pivotally mounted on said base member at equiangularly spaced apart points therearound for pivotal movement between the access and anchoring configurations of said anchor means, an elongated shaft extending axially of the nozzle and coupled at one end thereof to said base member, a collar member disposed in surrounding relationship with said shaft and movable longitudinally thereof, and linkage means interconnecting said anchor members and said collar so that as said collar moves toward said base member said anchor members are urged in an expanding direction, said anchor means being adapted for coupling to said seal means and radially frictionally engageable in its anchoring configuration with the inner surface of the nozzle securely to hold said seal means in its sealing condition.

2. The nozzle dam of claim 1, wherein said shaft is rotatable with respect to said base member, said collar being threadedly engaged with said shaft for longitudinal movement in response to rotation of said shaft about the axis thereof.

3. The nozzle dam of claim 1, wherein said shaft is fixedly secured to said base member, said collar being freely slidably movable longitudinally of said shaft.

4. A foldable nozzle dam for preventing fluid flow through a primary fluid nozzle in the plenum of a nuclear steam generating vessel, said nozzle dam comprising: fluid-impermeable seal means including a plurality of hingedly interconnected sections foldable between a relatively compact access condition facilitating insertion into the steam generating vessel and an expanded sealing condition, said seal means in the sealing condition thereof being disposable within and extending across the nozzle for closing same and frictionally engageable with the inner surface of the nozzle around the entire perimeter thereof to form a fluid-tight seal, anchor means separable from said seal means and including portions pivotally movable independently of said seal means between a relatively compact access configuration for facilitating insertion into the vessel and an expanded anchoring configuration, said anchor means in its anchoring configuration being mountable solely by radial frictional engagement with the inner surface of the nozzle, and means releasably coupling said anchor means to said seal means securely to hold said seal means in its sealing condition.

5. The nozzle dam of claim 4, wherein said seal means includes a substantially circular seal member foldable along parallel equal chords of the circle.

6. The nozzle dam of claim 4, wherein said anchor means includes a base member disposed centrally of the nozzle, and a plurality of anchor members pivotally mounted on said base member at equiangularly spaced apart points therearound for pivotal movement between the access and anchoring configurations of said anchor means.

7. A nozzle dam for preventing fluid flow through a primary fluid nozzle in the plenum of a nuclear steam generating vessel, wherein the nozzle has an inner surface with a circularly cylindrical portion and a frustoconical portion, said nozzle dam comprising: an elongated shaft extending axially of the nozzle, a base member coupled to said shaft at one end thereof, expandable anchor structure coupled to said base member for movement with respect thereto between contracted and expanded configurations, linkage means coupled to said anchor structure and to the shaft for effecting movement of said anchor structure between its retracted and expanded configurations, fluid-impermeable seal means disposable in a sealing condition within the nozzle extending across and closing the nozzle and frictionally engageable with the inner surface thereof around the entire perimeter thereof to form a fluid-tight seal, and seal retaining means fixedly connected to said shaft and engageable with said seal means for cooperation with said linkage for retaining said seal means in place in its sealing condition, said shaft cooperating with said base member and said anchor structure and said linkage means and said seal retaining means for preventing movement of said seal means in response to changes in the pressure differential thereacross.

8. The nozzle dam of claim 7, wherein said seal means includes a substantially frustoconical portion disposable in wedging frictional engagement with the frustoconical portion of the inner surface of the nozzle when said seal means is disposed in its sealing condition.

9. The nozzle dam of claim 8, wherein said seal means further includes an inflatable seal structure raddially expandable into frictional engagement with the inner surface of the nozzle.

10. The nozzle dam of claim 9, wherein said inflatable portion includes a frustoconical surface frictionally engageable with the frustoconical portion of the inner surface of the nozzle.

11. The nozzle dam of claim 7, wherein said linkage means includes a nut member threadedly engaged with said shaft, and link members pivotally coupled to both said nut member and said anchor structure, said linkage being responsive to rotation of said shaft for effecting movement of said anchor structure between the contracted and expanded configurations thereof.

12. The nozzle dam of claim 11, and further including means for preventing rotational movement of said nut member in response to rotation of said shaft.

13. A nozzle dam for preventing fluid flow through a primary fluid nozzle in the plenum of a nuclear steam generating vessel, wherein the nozzle has an inner surface with a circularly cylindrical portion and a frustoconical portion, said nozzle dam comprising: first fluid-impermeable seal means disposable in a sealing condition within the nozzle extending across and closing the nozzle, said first seal means having a substantially frustoconical sealing surface disposable in a sealing condition in wedging frictional engagement with the frustoconical portion of the inner surface of the nozzle around the entire perimeter thereof when said seal means is disposed in its sealing condition to form a fluid-tight seal, second fluid-impermeable seal means inflatable to a sealing condition disposed in frictional engagement with the inner surface of the nozzle to form a fluid-tight seal, anchor means separable from and operable independently of said first and second seal means to an anchored condition mounted solely by radial frictional engagement with the inner surface of the nozzle, and means releasably coupling said anchor means to said first and second seal means securely to hold said first and second seal means in the sealing conditions thereof.

14. The nozzle dam of claim 13, wherein said first seal means includes a fixed rigid seal member having a resiliently compressible portion, said frustoconical sealing surface being disposed on said compressible portion.

15. The nozzle dam of claim 14, wherein said compressible portion includes a first compressible member fixedly secured to said rigid member, said second seal means including an inflatable member coupled to said first compressible member and radially expandable upon inflation, and a second compressible member carried by said inflatable member and radially movable therewith upon inflation and deflation thereof, said first and second compressible members being disposed for frictional engagement with the frustoconical portion of the inner surface of the nozzle.

16. The nozzle dam of claim 13, wherein said second seal means is frictionally engageable with the frustoconical portion of the inner surface of the nozzle.

17. The nozzle dam of claim 13, wherein said inflatable second seal means has a sealing surface disposed for frictional sealing engagement with the circularly cylindrical portion of the inner surface of the nozzle.

18. The nozzle dam of claim 13, wherein said anchor means is disposed for frictional engagement with the circularly cylindrical portion of the inner surface of the nozzle.

19. The nozzle dam of claim 13, wherein said coupling means includes shaft means extending axially of the nozzle and connected to said anchor means, said anchor means being operable to its anchored condition in response to movement of said shaft, first connecting means engageable with said shaft means and movable with respect thereto for moving said first seal means to its sealing condition, and second connecting means engageable with said shaft means for holding said second seal means in its sealing condition.

20. A nozzle dam for preventing fluid flow through a primary fluid nozzle in the plenum of a nuclear steam generating vessel, wherein the nozzle has an inner surface, said nozzle dam comprising: fluid-impermeable seal means disposable in a sealing condition within the nozzle extending across and closing the nozzle and frictionally engageable with the inner surface thereof around the entire perimeter thereof to form a fluid-tight seal, anchor means separable from and operable independently of said seal means to an anchored condition mounted solely by radial frictional engagement with the inner surface of the nozzle, and means releasably coupling said anchor means to said seal means securely to hold said seal means in its sealing condition.

21. The nozzle dam of claim 1, wherein said seal means includes an inflatable seal portion.

22. The nozzle dam of claim 20, wherein said coupling means includes means responsive to a difference in pressure on the opposite sides of said seal means for increasing the frictional force with which said anchor means engages the inner surface of the nozzle.

23. The nozzle dam of claim 20, wherein said coupling means includes shaft means extending axially of the nozzle and connected to said anchor means, said anchor means being operable to its anchored condition in response to movement of said shaft means, and means connecting said seal means to said shaft means and movable with respect to said shaft means for moving said seal means to its sealing condition.

24. The nozzle dam of claim 23 and further including entering means for centering said shaft means in the nozzle during mounting of said anchor means 25. The nozzle dam of claim 20, and further including second seal means extending across and closing the nozzle and frictionally engageable with the inner surface thereof to form a fluid-tight seal.

26. The nozzle dam of claim 25, wherein said second seal means is inflatable to its sealing condition.

27. The nozzle dam of claim 25, and further including second coupling means coupling said anchor means to said second seal means securely to hold said second seal means in its sealing condition.

* * * * *